METHOD OF MANUFACTURING A MULTIPLE MAGNETIC RECORDING

Filed Dec. 1, 1959

INVENTOR
SIMON DUINKER
JULES BOS
BY
AGENT 3,105,286
METHOD OF MANUFACTURING A MULTIPLE MAGNETIC RECORDING

Simon Duinker and Jules Bos, Eindhoven, Netherlands, assignors to North American Philips Company Inc., New York, N.Y., a corporation of Delaware Filed Dec. 1, 1959, Ser. No. 856,539
Claims priority, application Netherlands Dec. 19, 1958
3 Claims. (Cl. 29—155.56)

Figures 1, 1A, 2, 3, 4:
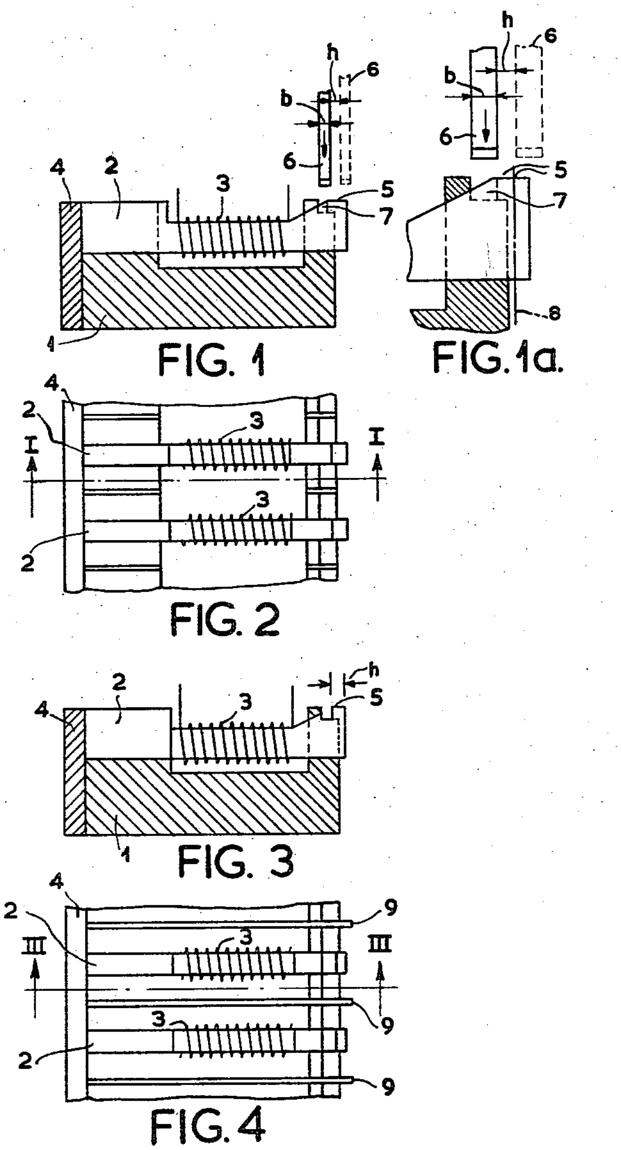

This invention relates to a method of manufacturing a multiple magnetic recording, reproducing and erasing head with equal gap heights, in which the two head-halves are made separately and then secured together with the interposition of a spacing strip. As used throughout the specification and claims "gap height" is defined as the depth of the gap measured from the edge of the gap defining pole face of a head half in contact with the magnetic medium, or tape, to the opposite parallel edge of the same gap defining pole face i.e. the distance $h$ illustrated in the attached drawing.

The process of manufacturing multiple magnetic recording, reproducing and erasing heads, in which the two series of individual head halves are made separately and subsequently mounted together, has a limitation in that the gap heights of individual heads vary so that, other things being equal, the self-inductance of these heads and hence the levels of the signals recorded and reproduced by these heads are not identical.

Endeavours have been made to obviate this disadvantage by making all the head halves as far as possible identical with respect to the proportions determining the gap volume. This means that the manufacture of the head halves must be kept within very close tolerances and also that the head halves must be mounted together quite carefully in order to obtain equal gap heights. In general, such a method is very expensive.

In the method according to the present invention, the above-mentioned disadvantages are mitigated in that a number of individual head halves are arranged in a holder provided with slots, in which the narrow side of the head halves are exposed with the gap defining surfaces or poleface turned upwards. The head halves are then secured in the slots and subsequently one boundary of the gap defining surface is made by cutting a groove into the head, for example by sawing, after which another boundary is formed by shifting the tool (saw) through a distance equal to the sum of the desired gap height and of the width of the groove (for example the sawcut) produced by the tool, in a direction parallel to and along the gap defining surface and finally the material projecting beyond this distance is removed from the head by means of the same tool. As compared with the method described in the preamble, one can start in this method not only without difficulty, with head halves the manufacture of which is kept within less close tolerances while mounting can take place with a lesser degree of accuracy, but also the advantage is obtained that by the production of the groove the ratio between the reluctance through the gap and that through the rear magnetic circuit is increased with a resulting decrease of the stray flux which is particularly likely to occur between opposed surfaces of the head halves in the proximity of the gap surfaces.

When the head halves are made of ceramic material (ferrite), the sawcut, which may be made by means of a diamond saw, gives a sharply defined gap height and this is one of the factors determining the self-inductance and thus the behaviour of the head.

In order to ensure that the rear faces of the head halves will also lie precisely in the same plane, these rear faces can be equalized, for example by sawing; however, preferably the individual head halves are pressed to the holder wall closing the slots at the rear before they are secured in these slots.

The invention also relates to a multiple magnetic recording, reproducing and erasing head made by the method in accordance with the invention.

In order that the invention may readily be carried out, an embodiment thereof will now be described, by way of example, with reference to the accompanying diagrammatic drawings, in which FIG. 1 is a cross-sectional view of a holder provided with a number of head halves before the use of the method in accordance with the invention, and FIG. 2 is a plan view of the holder shown in FIG. 1, while FIGS. 3 and 4 show the corresponding assemblies after the use of the method.

In the figures, reference numeral 1 denotes a holder provided with a number of slots. In these slots are arranged a number of similar head halves 2 with their narrow sides turned upwards as is clearly visible in FIG. 2. The head halves are provided with windings 3 and, before they (head halves) are secured in the slots, they can be pressed to the rear wall 4 of the holder 1 so that the rear faces of the head halves become co-planar. Referring to FIG. 1*a* more particularly the pole face is formed after each head half is set in the holder by first cutting a groove the width of saw 6 in each head half. The groove to be cut, or the material to be removed in cutting said groove, is shown in dotted lines of FIG. 1*a* and indicated by reference numeral 7 in FIGS. 1 and 1*a*. After cutting such a groove in each head half the saw blade is shifted through a distance equal to the desired gap height $h$ plus the width of the saw blade $b$ and the end of each head half projecting beyond the plane indicated by broken line 8 is removed.

After the overall length of the head halves and the gap heights have been made uniform, the gap defining surfaces 5 are polished without the area of the pole faces or gap heights being modified thereby (FIG. 3). Then Mumetal screens 9 (which may be flanked by screenings made of copper or some other conductive material) are interposed between the individual head halves (FIG. 4) in order to reduce the mutual coupling, and the two series of head halves are assembled together from individual elements processed in a single holder. Subsequently, the individual heads obtained in this manner are measured, since at this stage individual heads from the set can still be replaced and exchanged. If no defects are found in the heads, the two parts of the set are definitively secured together with the interposition of the spacing strip (not shown) determining the gap length or distance between pole faces as is well known. This spacing strip may be made from beryllium copper or another conductive material and is provided with a thin insulating film to prevent short circuits by way of the head holder (not shown).

The holder is preferably made of metal, for example brass, so that the individual heads (neglecting the screening plates 9) are entirely enclosed by non-magnetic material.

After the two parts of the set have been united together, the front faces of the heads can jointly be ground or polished again in order to remove the inequality which the set halves may show due to inaccuracies in sawing or to bring the surface condition of the front faces in agreement with the requirements to be satisfied. However, such a subsequent treatment does not interfere with the essence of the uniforming process.

What is claimed is:

1. A method of manufacturing the pole pieces of magnetic head halves to be used together and which, when assembled to form a complete head, will have equal self-reluctance and increased reluctance through the gap, comprising the steps of preforming the head halves to easily maintained manufacturing tolerances, inserting a plurality of said head halves in a holder means having a planar surface with the gap defining pole piece projecting beyond said holder and one end of each head half abutting said planar surface, removably securing said head halves in said holder, forming a groove normal to the longitudinal axis of each of said head halves in the pole piece thereof and spaced from the other end of said head halves a distance greater than a determined gap height in one operation, trimming the said end of each of said head halves in a plane parallel to the plane of said groove and spaced therefrom a distance equal to said determined gap height in a second operation, said trimming step also cutting said head halves to equal lengths measured along their longitudinal axis.

2. A method according to claim 1 wherein said trimming step is performed prior to said groove forming step and the space between the trimmed surface of said head half and said groove is equal to a determined gap height.

3. A method of manufacturing magnetic heads which have equal self inductance characteristics and high reluctance through the gaps comprising the steps of forming head halves to readily maintained manufacturing tolerances, removably securing a plurality of head halves thus formed in a jig with the gap defining surfaces substantially aligned and exposed, forming a groove in each said surface in a plane normal to said surface and spaced from the adjacent end of each of said head halves a distance at least as great as a desired gap height in one operation, and trimming the adjacent end of each of said head halves in a plane parallel to the plane of said groove in a second operation to form pole pieces on said head halves having identical determined gap heights when said head halves thus formed are assembled to form a magnetic head.

References Cited in the file of this patent

UNITED STATES PATENTS

| | | |
|---|---|---|
| 995,537 | Hertner et al. | June 20, 1911 |
| 2,636,856 | Suggs et al. | Apr. 28, 1953 |
| 2,743,507 | Kornei | May 1, 1956 |
| 2,915,812 | Rellinger | Dec. 8, 1959 |
| 2,928,907 | Lubkin | Mar. 15, 1960 |
| 2,991,511 | Kornei | July 11, 1961 |

OTHER REFERENCES

Audio Engineering, August 1953 (Multiple-Track Magnetic Heads, page 34, relied on).